Jan. 21, 1964  TOMIO YAZAWA  3,119,053
POINT CONTACT DEVICE HAVING SHOCK RESISTANT MEANS
Filed May 23, 1962

INVENTOR
TOMIO YAZAWA

United States Patent Office  3,119,053
Patented Jan. 21, 1964

3,119,053
POINT CONTACT DEVICE HAVING SHOCK RESISTANT MEANS
Tomio Yazawa, Tokyo, Japan, assignor to Nippon Electric Company Limited, Tokyo, Japan, a corporation of Japan
Filed May 23, 1962, Ser. No. 197,149
4 Claims. (Cl. 317—236)

This invention relates to a device for detecting electric signals and more particularly to such a device wherein a probe or whisker is employed in contact with a semiconductor element.

Point contact detectors of the prior art generally comprise a pair of electrodes disposed in spaced relationship with respect to each other, one electrode having a semiconductor element and the other electrode having a probe, and are rendered operable by engaging the point of the probe with the element. Arrangements have been employed in which the probe is generally S or U-shaped or in which a spring of such shape is employed with a straight probe element in an effort to provide sufficient pressure between the probe and semiconductor element so as to achieve good mechanical stability and high impact shock resistance. For extremely small detector constructions however, such prior art probe arrangements lack sufficient pressure to provide the desired degree of mechanical stability and impact shock resistance.

Accordingly, it is an object of this invention to provide an electric signal detector of miniature size in which sufficient pressure is produced between the probe and the semiconductor element to afford a higher degree of mechanical stability and impact shock resistance than similar type devices of the prior art.

It is another object of this invention to provide a construction for a point contact detector wherein the most desirable electrical characteristic can be achieved by adjustment of a sub-assembly portion of the detector before incorporation of this sub-assembly into the final assembled unit.

Other objects, features and advantages of the invention will be apparent to those skilled in the art from the following description taken in conjunction with the claims and the drawing in which:

The invention will now be described with reference to the drawing in which like numerals in the various figures indicate like parts.

Figure 1:
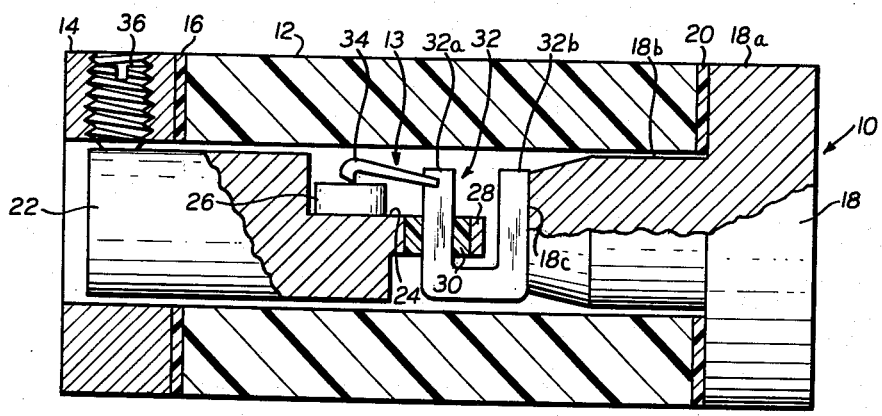
FIG. 1 is an enlarged longitudinal sectional view of a point contact detector constructed in accordance with the principles of this invention.

Referring first to FIG. 1, the numeral 10 indicates generally a detector in accordance with the invention, having an insulating cylinder 12 of glass or other ceramic within which is disposed a detector sub-assembly 13 comprising various parts as will later appear. An annular electrode 40 is secured by a suitable binding agent 16 to one end of the cylinder 12, this electrode preferably having inside and outside diameters substantially equal to that of cylinder 12. A cylindrical or disc-shaped electrode 18 having a flange portion 18a and a central extending portion 18b is similarly secured to the other end of the cylinder 12 by a binding agent 20, the outer diameter of this electrode preferably being equal to that of the cylinder 12. These parts 12, 14 and 16 together form a casing or housing for the sub-assembly.

The detector sub-assembly 13 of FIG. 1 includes a generally cylindrical-shaped conductive base member 22 having a portion cut away to provide a surface 24 upon which is mounted a semiconductor element 26. The inner end of the cylindrical member 22 has a portion 28 of reduced cross-section which is provided with a hole or aperture in which is mounted an insulating annular mount 30 having a central opening for receiving a spring member 32 of generally U-shape as shown, although other suitable shapes may be employed. The leg 32a of the spring 32 may alternatively be secured to the portion 28 of the member 22 by means of a synthetic thermosetting resin having suitable insulating characteristics. A probe or whisker 34 having a pointed end is secured such as, for example, by welding to the leg 32a of the spring 32. Proper pressure can be obtained between the point of the probe 34 and the surface of the semiconductor 26 by bending the probe downwardly while holding the leg 32a of the spring 32 in a position in which it is flexed to the right. The particular point of contact of the probe on the surface of the semiconductor 26 which will produce the most desirable ratification characteristic can be obtained by bending the probe in a plane perpendicular to the paper, to various positions and testing the results by appropriate testing means well known in the art, connected between the cylindrical member 22 and the spring 32. This is, of course, accomplished while the sub-assembly 13 comprising the member 22, semiconductor 26, spring 32 and probe 34 is outside the casing comprising the cylinder 12 and the electrodes 14 and 18.

The sub-assembly 13 is then inserted into the internal space provided within the annular electrode 14 and cylinder 12 until the leg 32b of the spring 32 is very firmly biased against the end surface 18c of the electrode 18. This will assure reliable electrical contact between the spring 32 and the electrode 18 under all conditions including that of high impact shock. A screw 36 is provided in the annular electrode 14, which is tightened firmly against the cylindrical member 22 when the spring 32 is firmly biased against the surface 18c as described above, to hold the sub-assembly 13 in its proper position.

Figure 2:
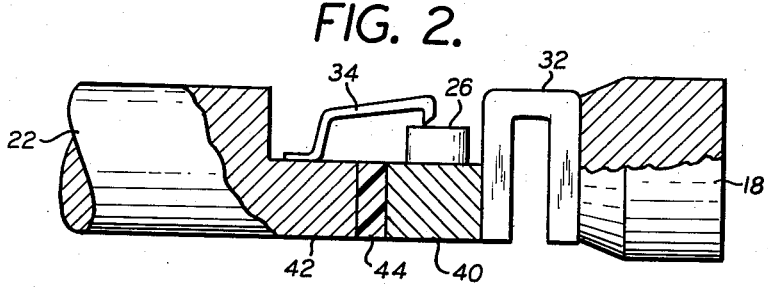
FIG. 2 is a further enlarged longitudinal sectional view of a modified portion of FIG. 1.

A modification of the sub-assembly 13 portion of the detector unit is shown in FIG. 2 in which the spring 32 is insulated from the conductive cylindrical base member 22 by an alternative arrangement to that shown in FIG. 1. Accordingly the spring 32 is suitably secured to a conductive extension member 40 which is fixed by an insulating medium such as for example, a thermosetting resin 44 to the end portion 42 of the cylindrical member 22 to form a part thereof. Alternatively, an insulating member could be employed between the parts 40 and 42 and secured thereto by a suitable binder. The semiconductor element 26 is mounted on member 40 and the probe 34 is mounted on the portion 42 of the cylindrical member 22. These parts may be reversed from that shown, if desired, i.e. the semiconductor could be mounted on the portion 42 and the probe on the part 40. The manner of adjusting the probe 34 with respect to the surface of the semiconductor 26 and the manner of engagement of the spring 32 wtih the electrode surface 18c is substantially as described in conjunction with FIG. 1.

Figure 3:
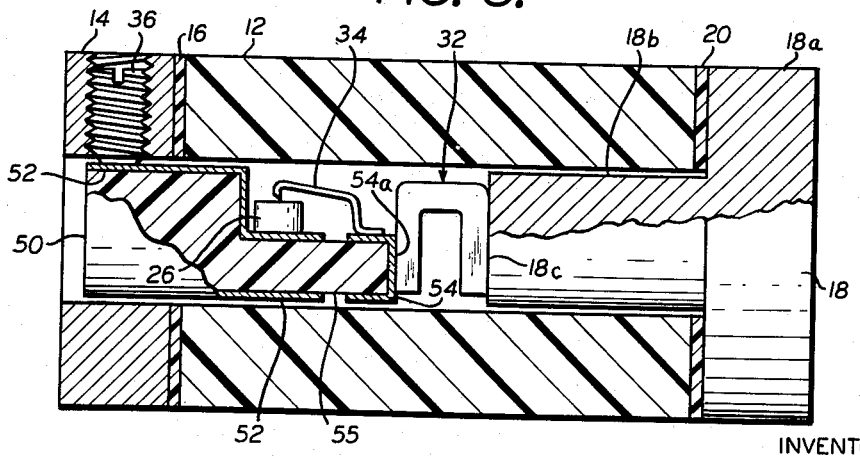
FIG. 3 is a longitudinal sectional view of an alternative embodiment of the invention.

FIG. 3 illustrates an arrangement for the subassembly 13 which resembles that of FIG. 2 in various aspects although it is somewhat different. The conductive cylindrical member 22 of FIG. 2 has been replaced in FIG. 3 by a cylindrical base member 50 of insulating material and having a shape similar to that of member 22. This member 50 is provided with a metal coating 52 and a metal coating 54, this latter coating being disposed on the inner end piece 55 of the member 50, but of both physical and electrical contact with the coating 52. The semiconductor element 26 is mounted in contact with the metal coating 52 and the probe 34 is mounted in contact with the coating 54. The spring 32 is suitably secured, as for example, by welding to the end surface 54a of the coating 54. As above, with respect to FIG. 2, the manner of adjusting the probe 34 on the surface of the semiconductor 26 and the manner of engagement of the spring 32 with the electrode surface 18c is substantially as described in conjunction with FIG. 1.

It will be appreciated that due to the nature of the point contact detector design described herein whereby the probe and the semiconductor element are securely fastened to a rigid support base that excellent mechanical stability of the probe with respect to the semiconductor is achieved. Such construction also has been found to improve the resistance of the detector to shock impact. Additionally, the probe can be adjusted both as to proper contact pressure and as to point of contact on the semiconductor for optimum operation before insertion of the sub-assembly into the detector casing.

While the invention has been described with the aid of certain specific embodiments, it will be appreciated that various changes will occur to those skilled in the art. For example, the external configuration can be of various shapes besides cylindrical, the rectifier or semiconductor element and the probe can be mounted by various means and at various angles to the axis of the cylindrical members 22 and 50, the shape of the spring 32 can be modified, and the annular electrode 14 can be replaced by a disc-shaped electrode wherein after inserting the sub-assembly into the case body, the case can be tightly sealed by means of a thread on the cylinder 12 and a corresponding thread on the disc-shaped electrode.

Since many changes could be made in the above invention and many apparently widely different embodiments of this invention could be made without departing from the scope thereof it is intended that all matter contained in the above description or shown in the accompanying drawing shall be interpreted as merely illustrative and not in a limiting sense.

I claim:

1. A point contact detector comprising
    an annular electrode and a generally cylindrical electrode disposed in spaced relationship with each other,
    a housing member secured to each of said electrodes to thereby form a casing having an internal space defined therein,
    a holding screw provided in said annular electrode,
    a base member rigidly secured in said space by said holding screw,
    a semiconductor element mounted on said base,
    a spring member mounted on said base and insulated from a portion thereof,
    a probe having one end mounted in fixed relationship with said base, said probe having a pointed end in pressure contact with said semiconductor element,
    said spring member having a portion in a flexed position to thereby provide pressure contact between said spring and a portion of said cylindrical electrode,
    and means to provide an electrically conductive path between said semiconductor element and one electrode and between said probe and said other electrode.

2. The invention recited in claim 1, wherein said base is of electrically conductive material and wherein said spring member is generally U-shaped, one of the legs of said spring member being secured to said base member, the other leg being in pressure contact with said cylindrical electrode.

3. The invention recited in claim 1 wherein said base member comprises two portions of conductive material insulated from one another, said semiconductor element being mounted on one of said portions and said probe being mounted on the other of said portions.

4. The invention recited in claim 1 wherein said base member is made of electrically insulating material having two electrically separate metal coatings deposited on the surface thereof,
    one of said coatings comprising said means for providing an electrically conductive path between said semiconductor element and one of said electrodes, the other coating comprising at least a portion of said means for providing an electrically conductive path between said probe and the other of said electrodes.

No references cited.